US005701445A

United States Patent [19]

Tang et al.

[11] Patent Number: 5,701,445

[45] Date of Patent: Dec. 23, 1997

[54] GENERATING MULTILAYERED PICTURES BY IMAGE PARAMETERS

[75] Inventors: Alex Tang, Hsinchu; Frank Chu, Hsinchu Hsien, both of Taiwan

[73] Assignee: United Microelectronics Corp., Taiwan, Taiwan

[21] Appl. No.: 533,344

[22] Filed: Sep. 25, 1995

[51] Int. Cl.$^6$ .................................................. G06F 12/06

[52] U.S. Cl. ......................... 395/516; 395/501; 345/200

[58] Field of Search .................................. 395/501, 516, 395/507, 513; 345/200, 189, 190; 463/31-33, 1

[56] References Cited

U.S. PATENT DOCUMENTS

| | | | |
|---|---|---|---|
| 5,016,876 | 5/1991 | Loffredo | 463/33 |
| 5,550,961 | 8/1996 | Chimoto | 395/133 |

*Primary Examiner*—Kee M. Tung

*Attorney, Agent, or Firm*—Cushman Darby & Cushman IP Group of Pillsbury Madison & Sutro LLP

[57] ABSTRACT

An apparatus for generating pictures comprising a memory device, an address generator, a vertical position detector, a register, a horizontal position counter, a processor and a state machine. Pictures shown in the display are formed based on image parameters stored in the memory device. These parameters are read from memory by controlling the address generator. The parameters read from memory are then processed by the processor before being output to the display. The vertical position detector and the horizontal position counter are provided for controlling the parameter processing. Control signals are generated in the state machine to control the apparatus. By splitting pictures into image cells and skillfully arranging corresponding parameters, colorful pictures with various layer levels are effectively shown in the display.

7 Claims, 10 Drawing Sheets

GENERATING MULTILAYERED PICTURES BY IMAGE PARAMETERS

BACKGROUND OF THE INVENTION

1. Field of the Invention

The present invention relates to image processing, and more particularly, to apparatus for generating pictures based on parameters stored in a memory.

2. Description of Related Art

Apparatus for generating pictures having various layers has been widely used in systems such as video game machines. The pictures are activated and become more attractive after multi-layer processing. However, the pictures are not vivid enough to meet the requirements of critical consumers due to the limitations on picture sizes, colors and numbers of figures in each display. One way to overcome the limitations is to run image processing software on a high-performance central processing unit (CPU). However, this would significantly add to the price of a video game and make it unaffordable to most game players. Also, it would take additional time to design the image processing programs, thus increasing the time required to bring a game to market.

An alternative to the software solution is to provide a hardware design to improve the picture processing capability of the display system. However, the large amount of image data and inconsistency of various display systems may waste a lot of hardware resources. Moreover, the circuit design may be too complicated to implement in an integrated circuit through well-developed techniques.

SUMMARY OF THE INVENTION

Accordingly, the present invention provides an apparatus for generating pictures based on parameters stored in a memory to improve the picture processing ability of a display system.

The present invention provides an apparatus for generating pictures by parameters to minimize the dependency on the performance of the CPU, thus increasing the consistency of the display system. The apparatus splits pictures into elements to which reduces the need for a complex circuit design, thus decreasing the hardware requirements and also reducing the manufacturing cost.

The major components of the apparatus are a memory device, an address generator, a vertical position detector, a register, a horizontal position counter, a processor and a state machine. Pictures shown in the display are made based on a number of image parameters which are stored in the memory device. These parameters are read out from the memory device by controlling the address generator and then processing the information read from memory in the processor before outputting to the display. The vertical position detector and horizontal position counter are provided for controlling the parameter processing. Control signals are generated in the state machine to control the whole apparatus. By splitting pictures into image cells and skillfully arranging corresponding parameters, colorful pictures with various layers are effectively displayed.

BRIEF DESCRIPTION OF THE DRAWINGS

The various features of the present invention will become more apparent by reference to the following descriptions in connection with accompanying drawings, wherein.

DETAILED DESCRIPTION OF PREFERRED EMBODIMENTS

Figure 1:
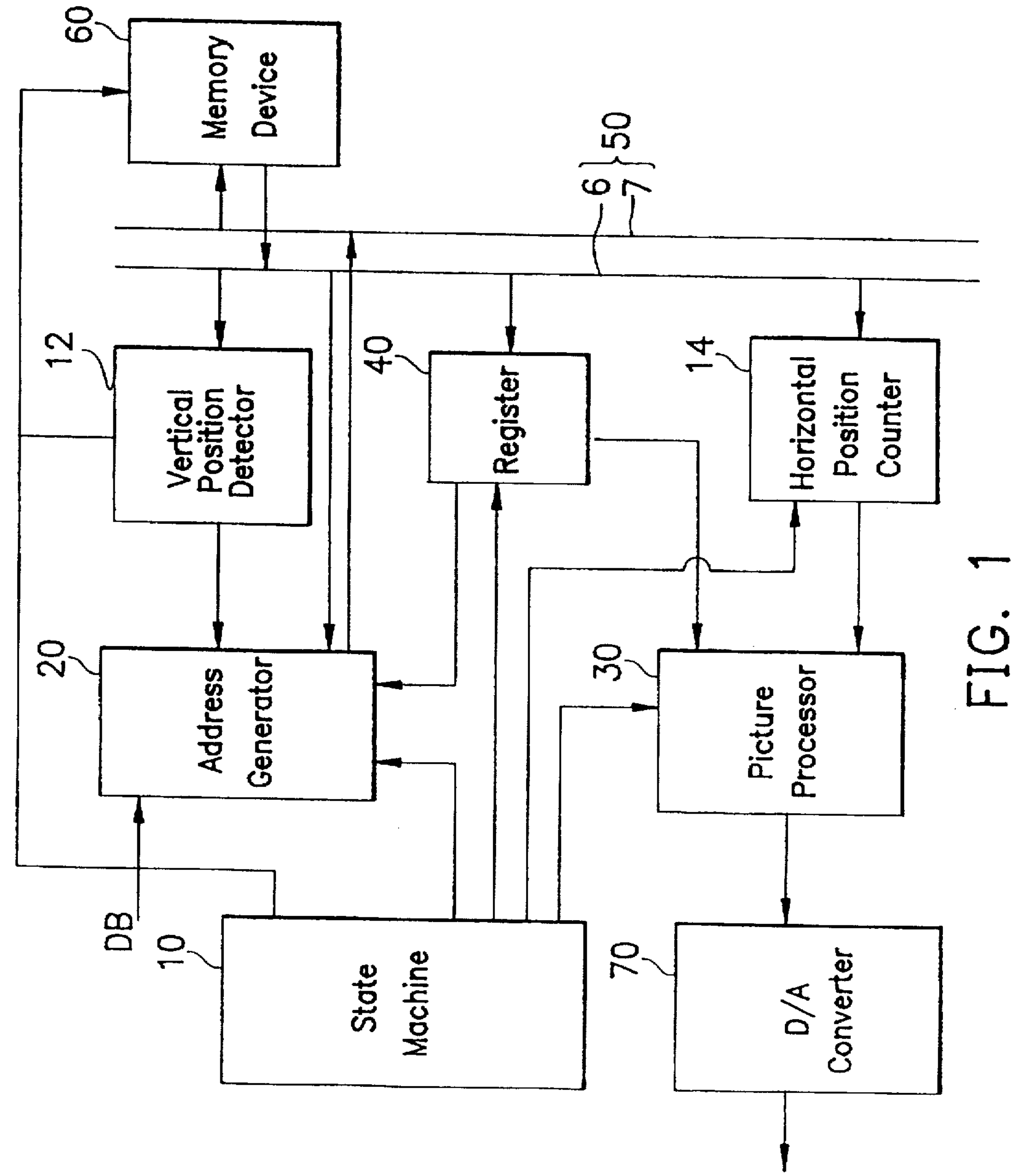
FIG. 1 is a schematic diagram of an apparatus for generating pictures according to the present invention.

FIG. 1 is a block diagram of the architecture of an apparatus for generating pictures according to the present invention. The apparatus comprises a memory device 60, an address generator 20, a vertical position detector 12, a register 40, a horizontal position counter 14 and a state machine 10. A bus 50 provides data interconnection among the aforementioned elements. All the elements are operated under the timing control of state machine 10. A digital-to-analog (D/A) converter 70 may also be provided in the apparatus to convert output data.

In the present invention, a plurality of parameters, such as layer codes and color codes, are stored in memory device 60. When a signal DB for starting picture generating is sent to address generator 20, addresses for accessing parameters stored in memory device 60 are sequentially generated. Vertical position detector 12 detects corresponding vertical positions of the parameters in the display and then causes address generator 20 to further generate addresses of color codes and other parameters to memory device 60. The parameters from memory device 60 are stored in register 40. Horizontal position counter 14 decides the corresponding horizontal position of output data in the display. Picture processor 30 follows instructions from horizontal position detector 14 and state machine 10 to process the parameters stored in register 40. Tasks carried out in picture processor 30 include color mixture, separation of layers and transparency. Output data can be sent to display through D/A converter 70 after the processing tasks of picture processor 30.

Since the display is too broad, it is not possible for each pixel thereof to be represented by a set of parameters in memory device 60 with a reasonable capacity of memory and data processing time. Therefore, splitting pictures into elements is utilized to simplify the required data structure. For example, each element of the pictures, referred to as an image cell, can have a dimension of 8(8 pixels. If each color code is a four-bit parameter, the color code of each image cell can be represented by a 16-word parameter. Therefore, in memory device 60, a color code array consisting of color code DOT can be shown as in Table 1A.

TABLE 1A

| Address | VRAM Data Bus VDATA[15:0] | | | |
|---|---|---|---|---|
| +0 | DOT11[4:0] | DOT12[4:0] | DOT13[4:0] | DOT14[4:0] |
| +2 | DOT15[4:0] | DOT16[4:0] | DOT17[4:0] | DOT18[4:0] |
| +4 | DOT21[4:0] | DOT22[4:0] | DOT23[4:0] | DOT24[4:0] |
| ... | ... | ... | ... | ... |
| +28 | DOT81[4:0] | DOT82[4:0] | DOT83[4:0] | DOT84[4:0] |
| +30 | DOT85[4:0] | DOT86[4:0] | DOT87[4:0] | DOTB8[4:0] |

Picture processing based on units of image cells can reduce the complexity of circuit design and data structures. Thus, parameters corresponding to each dynamic image object (DIO) which is about to be shown in the display can be simplified into a data structure as listed in Table 1B.

TABLE 1B

| Address | VRAM Data Bus VDATA[15:0] |
|---|---|
| +0 | SCV[2:0] NVF[3:0] VPS[8:0] |
| +2 | FBK[2:0] — HMR VMR SCC CCA — MSC[2:0] NHF[2:0] |
| +4 | SCH[4:0] LY[1:0] HPS[8:0] |
| +6 | TPR[15:0] |

In Table 1B, parameters NVF and NHF represent for number of vertical fonts and number of horizontal fonts of each dynamic image object respectively. The two parameters are utilized to control dimensions of the pictures. That is, if the two parameters are selected, a picture having (NVF+1) $\times 2^{NHF}$ image cells can be determined, and the color codes of the picture are chosen from the color code array of table 1A. The color codes are addressed by a pointer array as shown in Table 1C.

TABLE 1C

| Address | VRAM Data Bus VDATA[15:0] | | | |
|---|---|---|---|---|
| +0 | CPT[3:0] | HMR | VMR | FNT[9:0] |
| +2 | CPT[3:0] | HMR | VMR | FNT[9:0] |
| +4 | CPT[3:0] | HMR | VMR | FNT[9:0] |
| ... | ... | ... | ... | ... |
| +2n | CPT[3:0] | HMR | VMR | FNT[9:0] |

The pointer array of Table 1C consists of exactly (NVF+1)$\times 2^{NHF}$ words. Each word of the pointer array contains a font pointer FNT which indicates the address of the color code array and the 4-bit color code. The elements of the pointer array are arranged in accordance with the order of image cells of the picture, and the address of the pointer array is decided by doubling the value of parameter TPR of Table 1B, i.e., TPR$\times$2. In order to make the data structure according to the embodiment of the present invention more comprehensible, the afore-mentioned parameters, i.e., the parameters of Table 1A through Table 1C, are redefined and explained in Table 2.

TABLE 2

| Parameter | bit | explanation |
|---|---|---|
| VPS[8:0] | 9 | up-right vertical position of the DIO in the display, i.e., the start point of the DIO |
| HPS[8:0] | 9 | up-right horizontal position of the DIO in the display, i.e., the start point of the DIO |
| LY[1:0] | 2 | layer level of image (layer code) |
| NVF[3:0] | 4 | number ot vertical fonts |
| NHF[2:0] | 3 | number of horizontal fonts |
| CPT[3:0] | 4 | clipboard parameter |
| DOTxx[3:0] | 4 | elements of color code array |
| FBK[2:0] | 3 | address of font block |
| FNT[9:0] | 10 | font pointer to image cells |
| TPR(15:0] | 16 | table pointer |
| VMR | 1 | vertical mirror parameter |
| HMR | 1 | horizontal mirror parameter |
| CCA | 1 | color mixture enable |
| SCC | 1 | single color code |
| NSC[2:0] | 3 | mosaic effect enable |
| SCV[2:0] | 3 | scaling-down control in the vertical direction |
| SCH[4:0] | 5 | scaling-down control in the horizontal direction |

Figure 2:
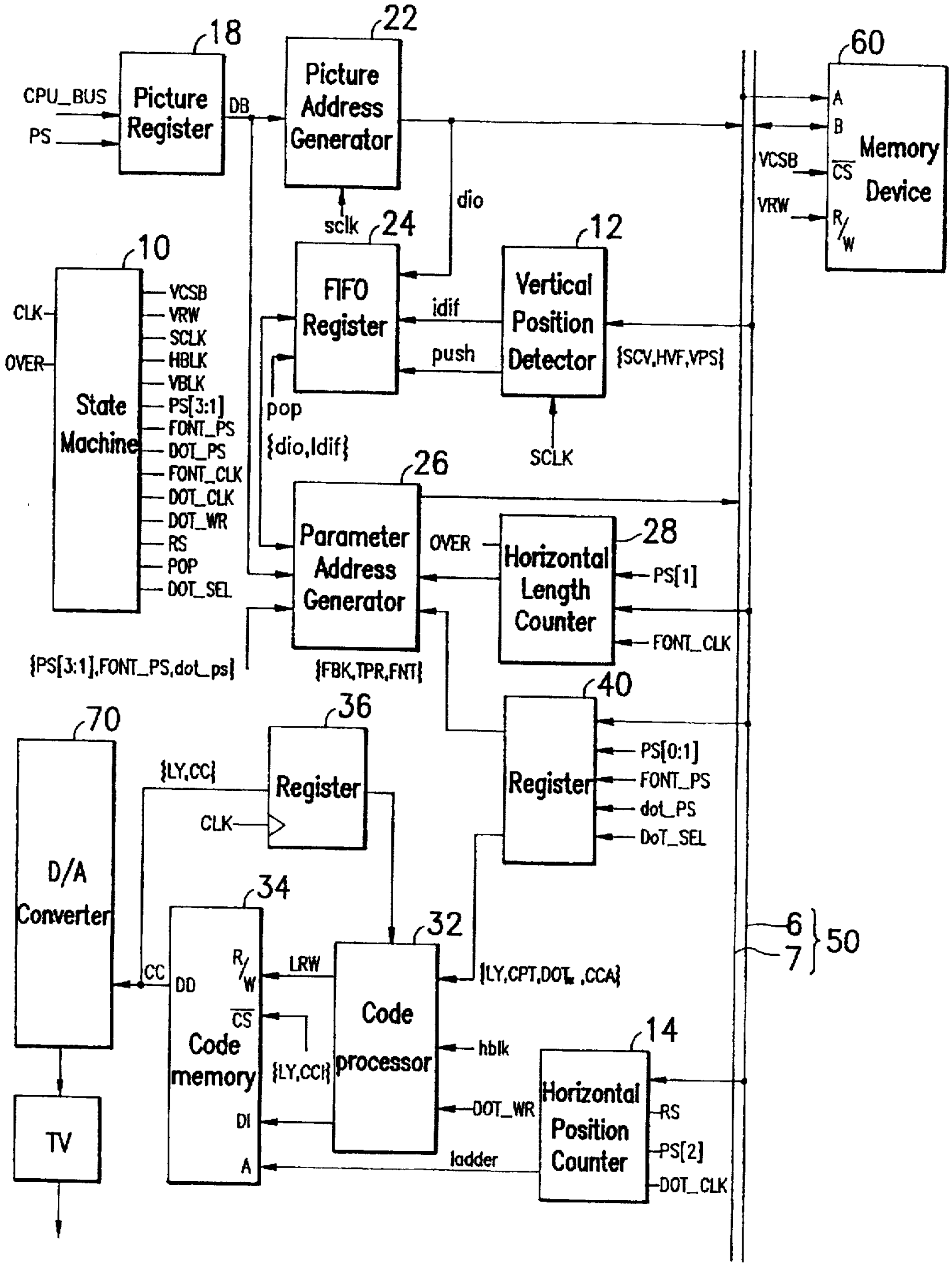
FIG. 2 is a circuit diagram of a preferred embodiment of the present invention.

FIG. 2 illustrates a preferred circuit structure of the invention according to the parameters of Table 2. The circuit comprises a state machine 10 which is driven by a clock signal clk for generating a number of control signals, thus having the circuit operated as desired.

Address generator 20 of FIG. 1 is constituted by picture address generator 22, first-in-first-out (FIFO) register 24, parameter address generator 26 and horizontal length counter 28, as is illustrated in FIG. 2. Picture address generator 22 is controlled by an initialized signal DB, which is sent out by picture register 18. When signal DB and a signal sclk generated from state machine 10 are active, picture address generator 22 will generate an address to select parameters of a specific picture in memory device 60. The parameters, as shown in Table 1B, are provided for detecting the vertical position of the picture by vertical position detector 12. That is, vertical position detector 12 reads the parameters and decides whether the picture is about to be shown in the next scanning line on the display. If the result of this decision is yes, FIFO register 24 sends parameters stored therein to parameter address generator 26 for further processing. These parameters are then sent to memory device 60 to obtain the corresponding color code array, as shown in Table 1C.

Picture processor 30 of FIG. 1 can be replaced by code processor 32, code memory 34 and register 36 of FIG. 2. Code processor 32 has parameters, color codes and pointers of the picture from register 40 for special processing, such as color mixture, separation of layer levels and justification of transparency. The results from code processor 32 are stored in code memory 34 whose capacity is large enough to store data of a scanning line on the display. The data stored in code memory 34 can be compared with any newly written data of the same display position in code processor 32 through the feedback route of register 36, and then be updated if there's modification. These processes are performed during a HSync (horizontal synchronous) period. When the HSync period stops, data stored in code memory 34 will be outputted to D/A converter 70 for data conversion and then show up in the display.

According to the above-described circuit structure, more detailed operation procedures of the preferred embodiment will be described as follows.

Figure 3:
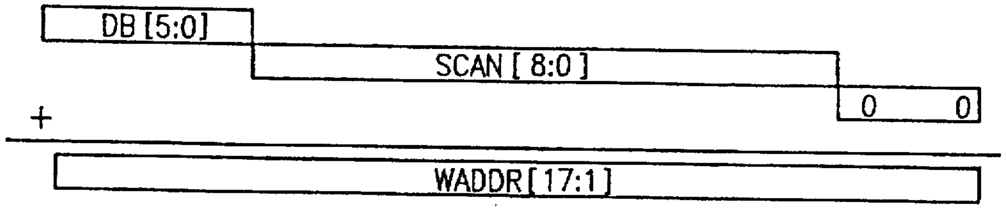
FIG. 3 is a schematic diagram illustrating data format in a memory device according to the invention.

First of all, signal DB, which is transmitted from the CPU (not shown in the drawings) of the display system, is stored in picture register 18. When the circuit begins the scanning period, an address based on signal DB is generated by picture address generator 22. The address whose format is depicted in FIG. 3 consists of signal DB and a count value SCAN. This address selects a parameter array in memory device 60, and the parameter array, as shown in Table 1B, is detected by vertical position detector 12.

Figure 4:
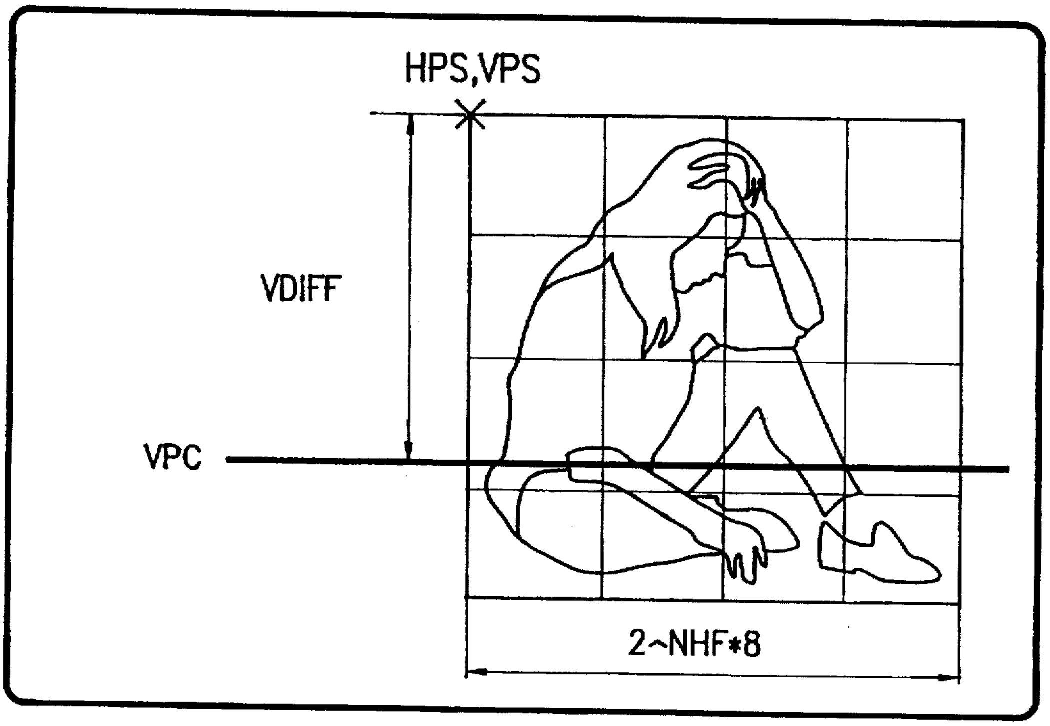
FIG. 4 is a schematic diagram defining parameters utilized in the present invention.

Vertical position detector 12 detects the position of the picture based on the first word, i.e., parameters SCV, NVF and VPS, of the array of Table 1B. The detecting procedure will be explained in accompaniment with the definition of FIG. 4. As shown in the figure, parameters HPC and VPC stand for horizontal and vertical coordinates of the scanning line, respectively, in the display, and parameters HPS and VPS indicate the upper-left position of the picture. Therefore, if $$VDIFF=(VPC+1)-VPS \text{ and}$$

$$ldif=VDIFF\times 2^{(2-SCV)}$$

for $0 \leqq ldif < NVF\times 8$ are satisfied, the picture will be shown in the next scanning line. Vertical position detector 12 will send signal push to FIFO register 24 in order to save data dio of picture address generator 22 and data ldif therein. Since parameter VDIFF stands for the distance between top of the picture and the present scanning line, through the operation of data ldif, which is provided for modifying the value of VDIFF, expanding or scaling down of the picture can be carried out.

Value in horizontal position counter 14 is reset to zero whenever the scanning period begins. The value increases by one as each dot-clock cycle is sent. Therefore, a signal ladder is generated by horizontal position counter 14 and sent to code memory 34 for controlling the output timing of color codes CC.

Figure 5:
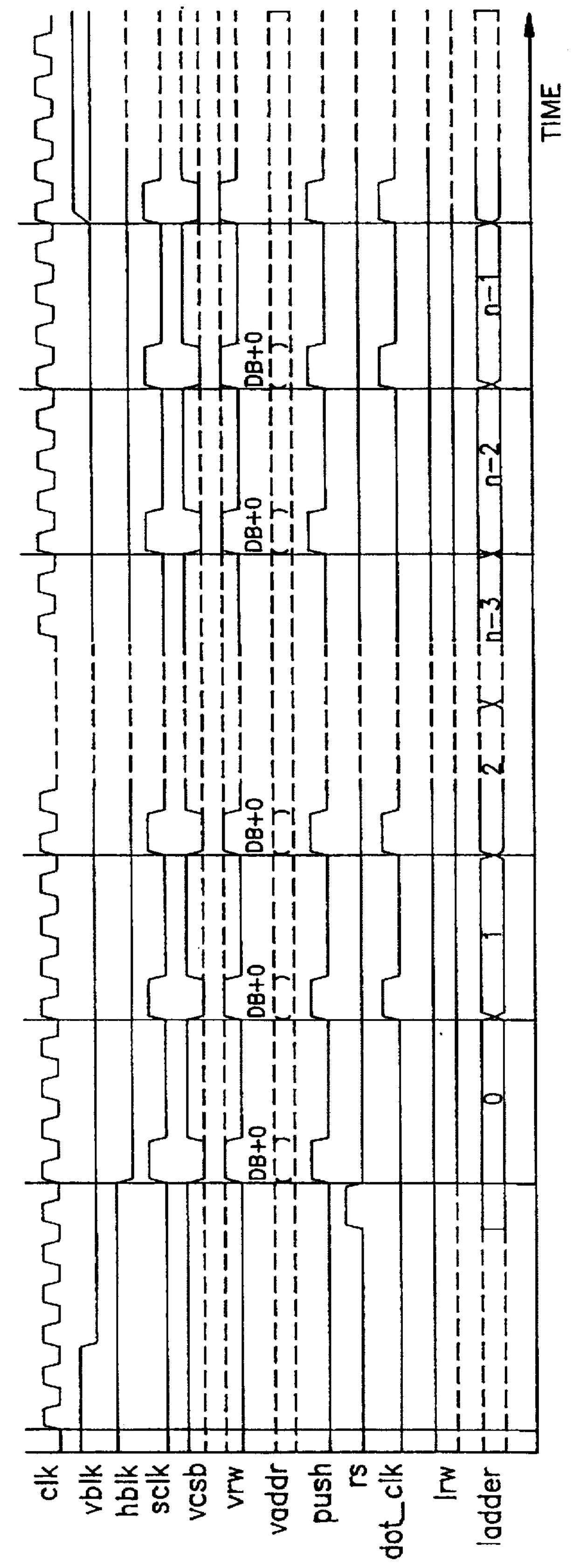
FIG. 5 is a timing diagram illustrating the operation of the circuit of FIG. 2.

Relationships between the aforementioned signals can be observed in the timing diagram of FIG. 5. When the scanning period stops, the circuit begins the HSync period, and a signal pop from state machine 10 is sent to FIFO register 24. Signal pop will force FIFO register 24 output parameters to parameter address generator 26 for generating addresses of pointer array and color code array.

Figure 6A:
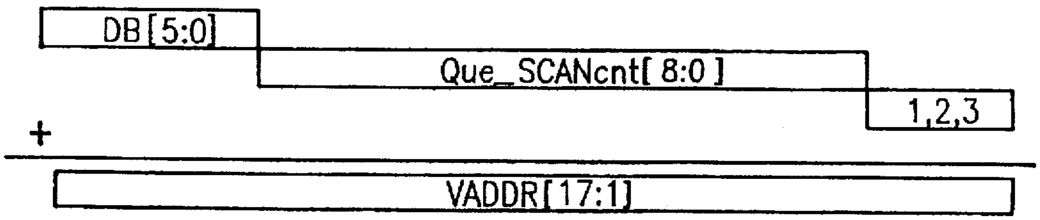
FIG. 6A through FIG. 6C are schematic diagrams illustrating data formats of signal VADDR.
Figure 6B:
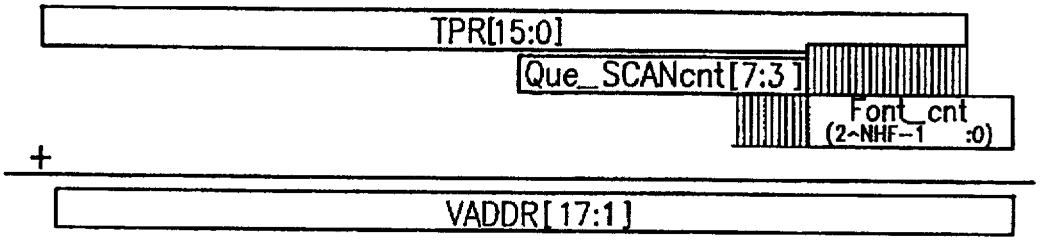
Figure 6C:
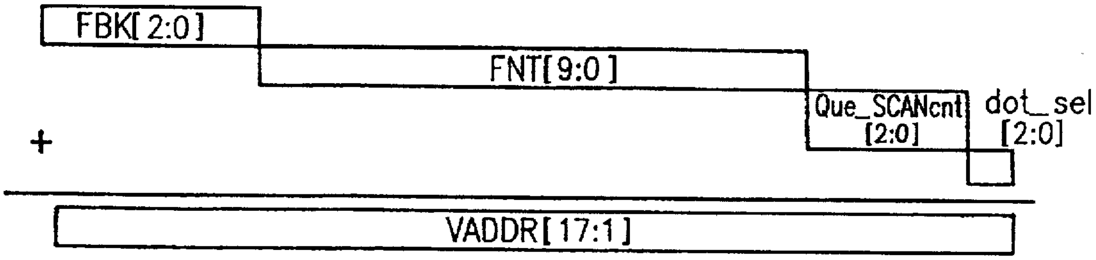

FIG. 6A through FIG. 6C illustrate the formats of address signal VADDR generated by picture address generator 22 and parameter address generator 26. Signal VADDR has a word length of 16 bits. The format depicted in FIG. 6A, which corresponds to signal VADDR from picture address generator 22, consists of a 6-bit signal DB, a 9-bit count value and a 2-bit quaternary end value. As to pointer address signal VADDR generated by parameter address generator 26, as shown in FIG. 6B, since the dimension of the pointer array is a variable, it consists of a signal Font-cnt whose word length is also a variable.

Figure 7:
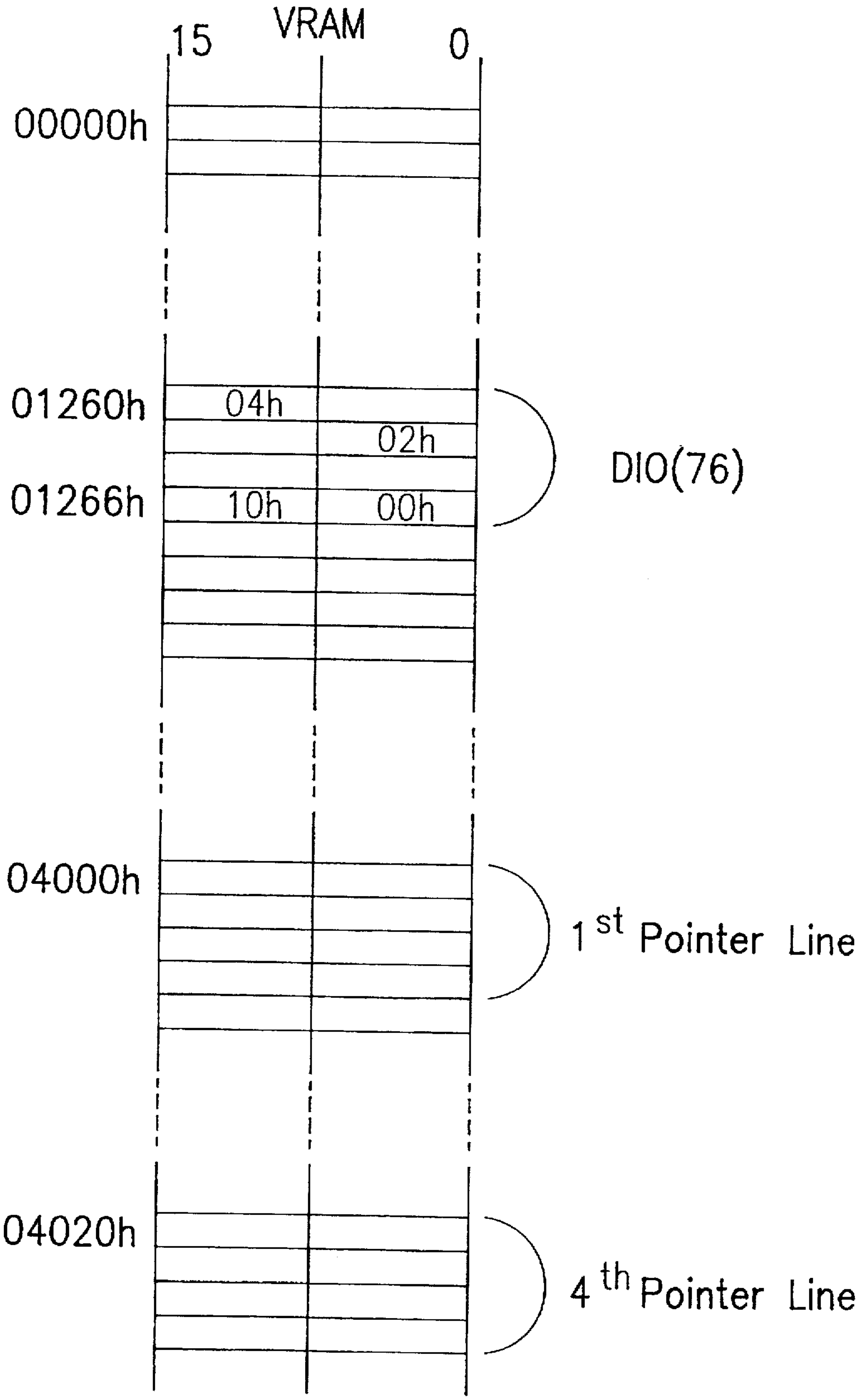
FIG. 7 and FIG. 8 are schematic diagrams illustrating data configurations in the memory device of the present invention.
Figure 8:
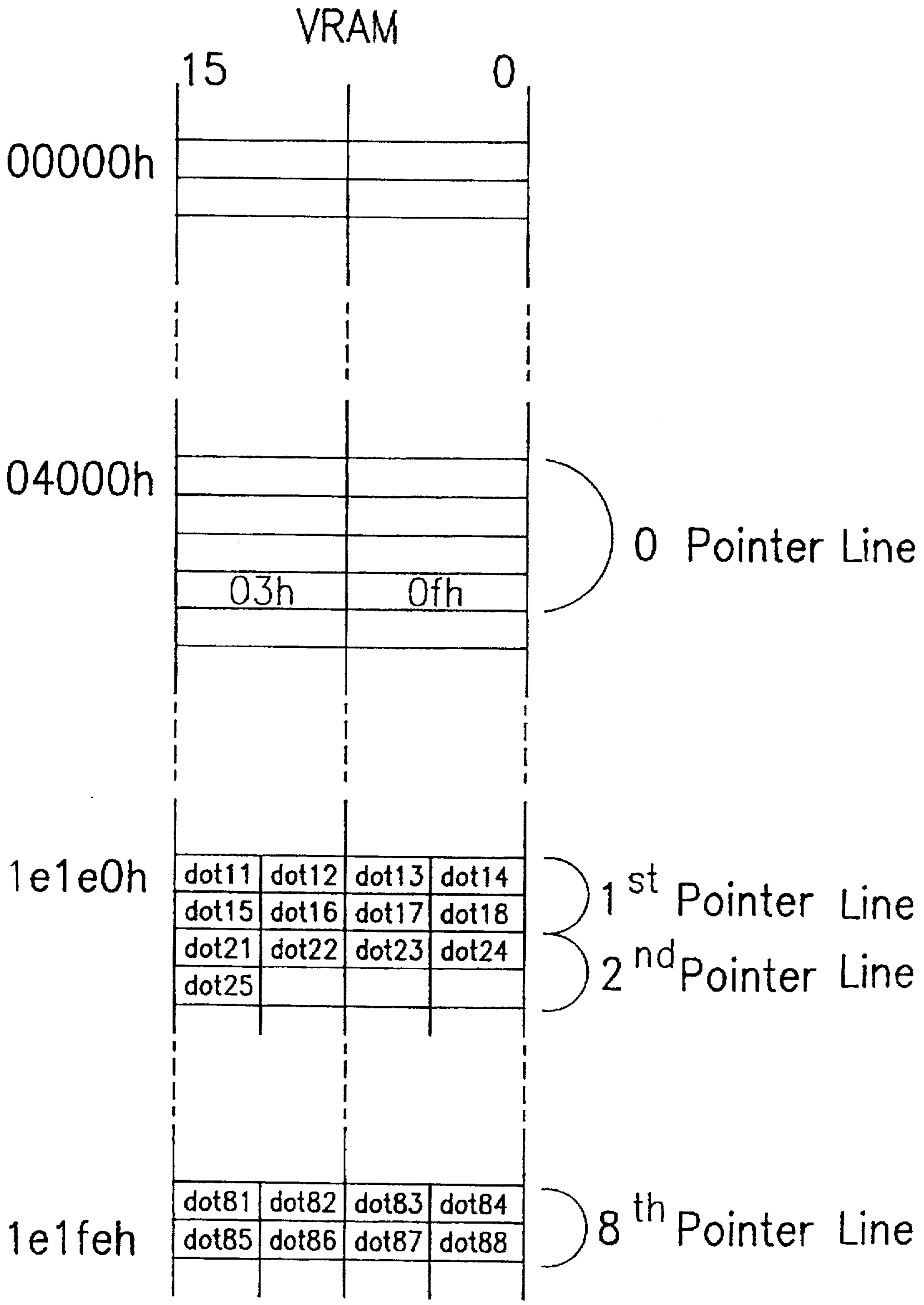

Address signal VADDR, as illustrated in FIG. 6A through FIG. 6C, is sent to memory device 60 to obtain corresponding parameters. For example, FIG. 7 and FIG. 8 illustrate the address modes of the parameters in memory device 60. Referring to FIG. 7, memory segment from 01260 h to 01266 h in memory device 60 is selected by address signal VADDR from picture address generator 22. Memory segment from 01260 h to 01266 h consists of four sets of 16-bit DIOs (dynamic image objects), i.e., parameter array DIO [76]. Referring to Table 1B, the parameter array has values 1000 h for parameter TPR, 2 h for NHF and 4 h for NVF. Therefore, the effective length of signal Font-cnt is 2-bit, i.e., the horizontal width of the picture is equivalent to four image cells. Whenever horizontal length counter 28 has the count value of 3, it will count from 0 and send out an overflow signal over in the next timing cycle. Signal over is sent to state machine 10 for generating signal pop and then begins the processing of another picture.

Since parameter TPR is 1000 h, as shown in FIG. 7, according to the address format of FIG. 6B, the corresponding pointer address in memory device 60 is 04000 h. Moreover, from the address of the first pointer array, when comparing FIG. 8 and Table 1A, the value of FNT is 30fh. Therefore, its corresponding color code array is the 8th pointer line in memory device 60.

Figure 9A:
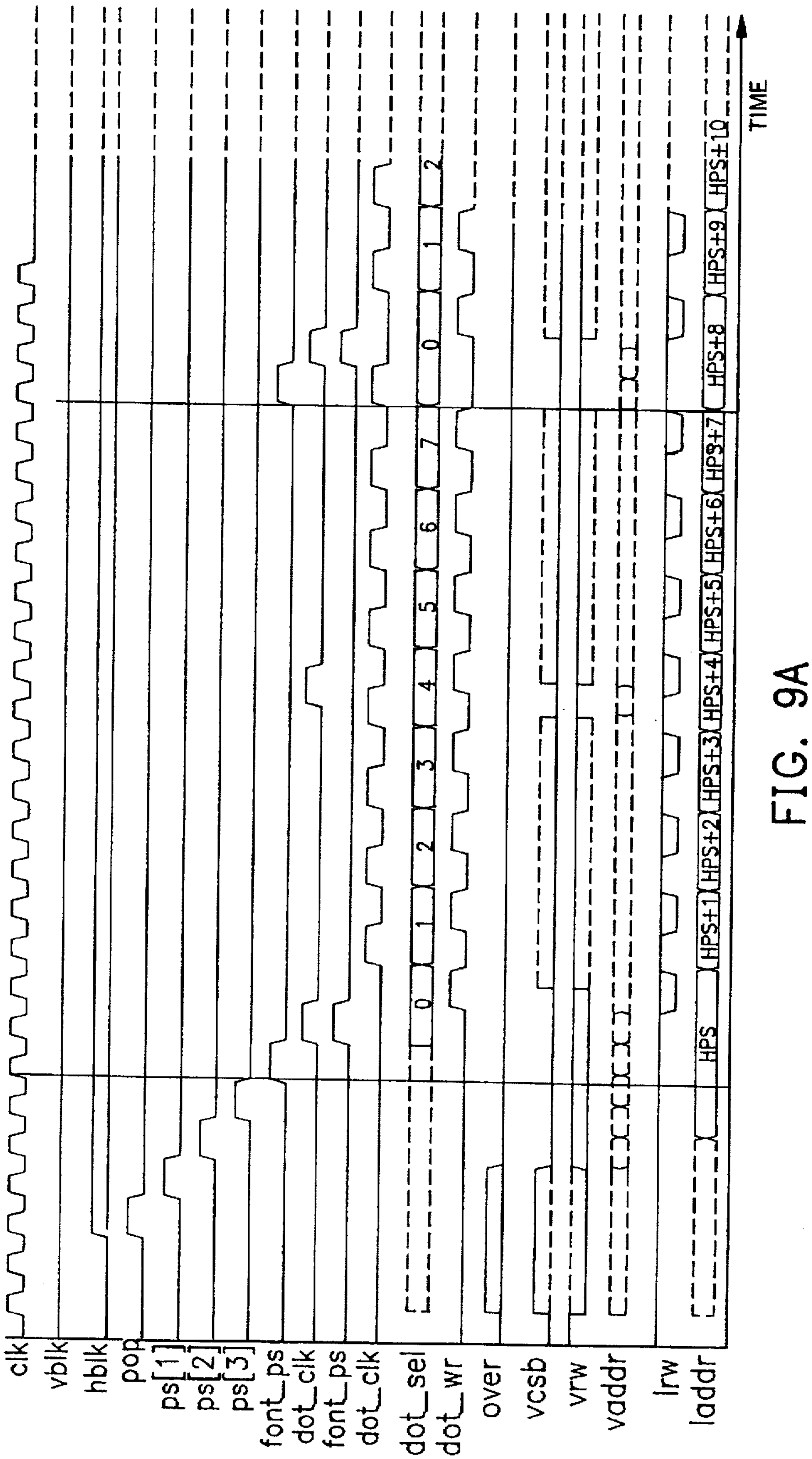
FIG. 9A and FIG. 9B are timing diagrams illustrating a preferred operation condition of the circuit of FIG. 2.
Figure 9B:
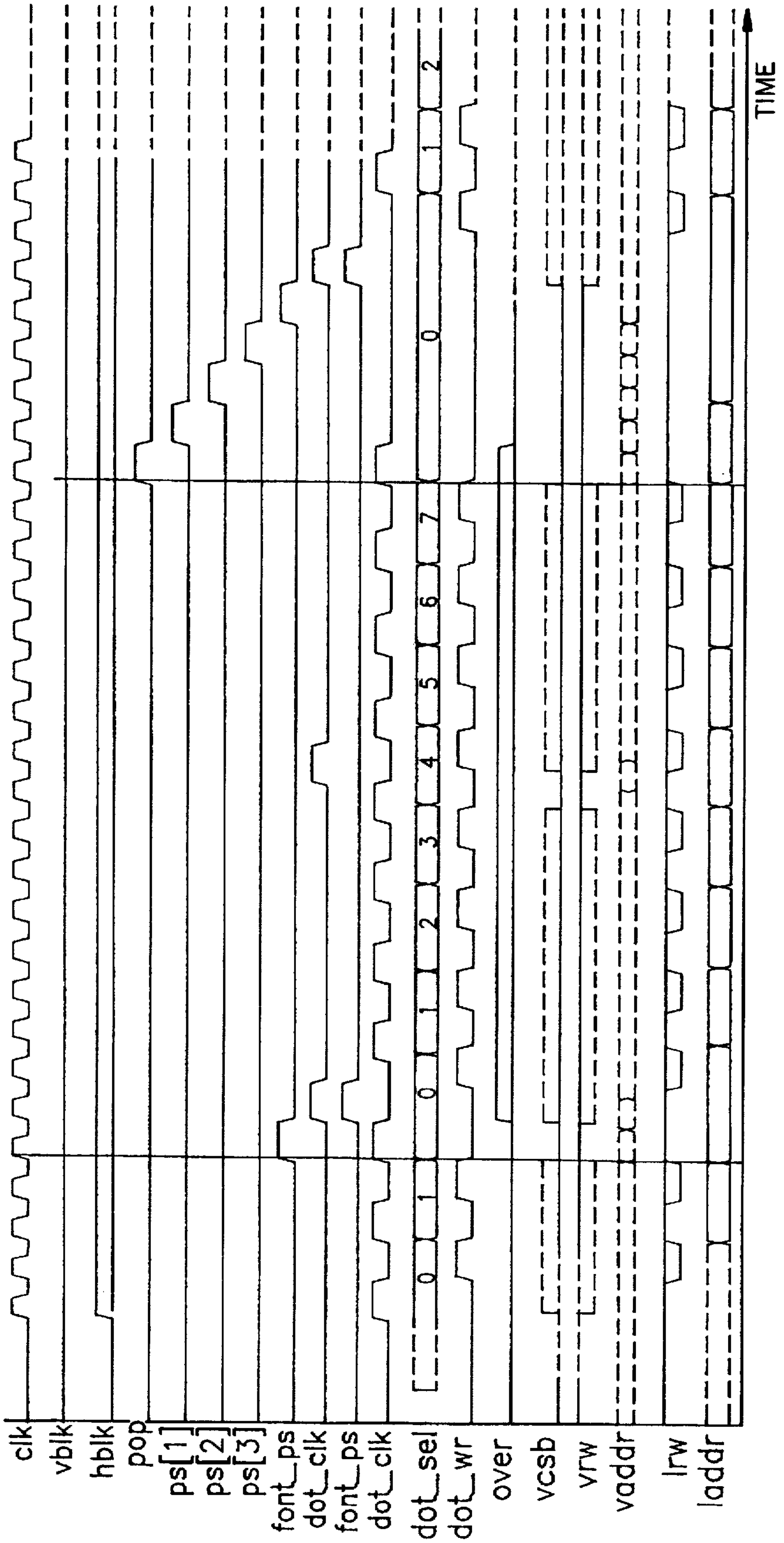

The aforementioned signals, such as signals pop, over and VADDR, have timing relationships illustrated in FIG. 9A and FIG. 9B. Most of the signals shown in the two figures are generated by state machine 10. Therefore, according to the timing relations, state machine 10 can be established by those skilled in the art.

Figure 10:
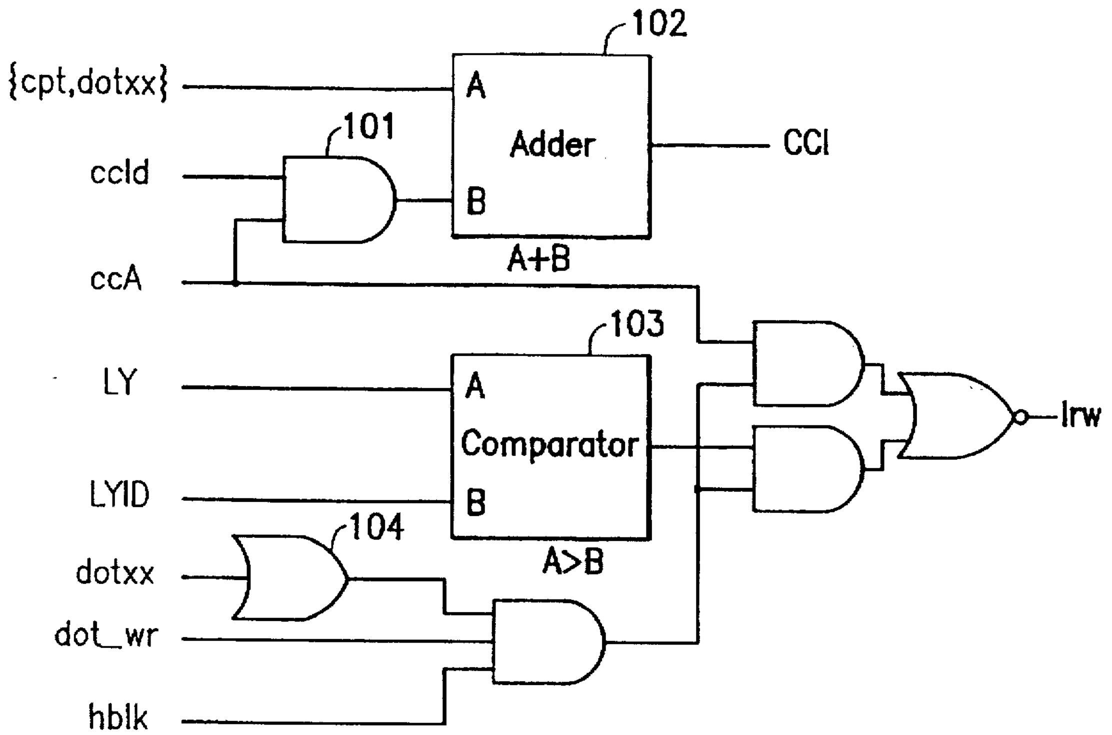
FIG. 10 is a circuit diagram of the processor of FIG. 2.

Code processor 32 which performs a number of post processing operations upon the output data will be described as follows. A preferred circuit of code processor 32 is illustrated in FIG. 10, wherein an adder 102 and a comparator 103 are provided. Input data [LY1D, CC1D] of the circuit, which is provided by register 36, consists of layer code LY and 8-bit color code CC of the same display position. An AND gate 101 is provided for color mixture. That is, when mixture enable signal CCA is active, color code CC1D will be added into an input color code in adder 102, while when signal CCA is disabled, the input color code is unaffected. On the other hand, in order to have the transparent effect, a color code of value 0 is defined as transparency. Therefore, when the color mixture process is carried out with a transparent code, the result from adder 102 is unchanged, thus keeping the original color. Moreover, an OR gate 104 is provided for detecting the transparent code. That is, when a transparent code is input, the output signal of OR gate 103 will have a high logic level, thus making signal lrw become high logic level for the non-writing state of code memory 34. When the input color code is not transparent, i.e., its value is not zero, the layer code will be compared in comparator 103. In the preferred embodiment of the present invention, there are four layers for each 2-bit layer code. Therefore, in order to replace the color code in register 34 by the input color code, the input layer code must have a value larger than that stored in register 36. Thus, if register 34 provides 32 units for the layer code, the circuit of the present invention can handle pictures of 32 layers.

After the process of code processor 32, the color codes are written into code memory 34 by the controlling of horizontal position counter 14, and then output to D/A converter 70 for further conversion and showing in the display.

What is claimed is:

1. An apparatus for generating pictures comprising:

a memory device;

an address generator coupled to said memory device for generating address signals;

a vertical position detector coupled to said address generator for controlling the generation of said address signals;

a first register for storing parameters selected from said memory device by said address signals;

a horizontal position counter for detecting a horizontal position of a picture determined by said parameters;

a processor for processing said parameters; and a state machine for controlling said memory device, said address generator, said vertical position detector, said first register, said horizontal position counter and said processor, wherein said address generator comprises:

a picture address generator for generating a parameter address; and a parameter address generator for generating a color code address.

2. The apparatus of claim 1 further comprising a first-in-first-out register for storing said parameter address.

3. The apparatus of claim 1, wherein said parameter address is provided for selecting a parameter array in said memory device, and said parameter array is provided to said vertical position detector for controlling the generation of said color code address.

4. An apparatus for generating pictures comprising:

a memory device;

an address generator coupled to said memory device for generating address signals;

a vertical position detector coupled to said address generator for controlling the generation of said address signals;

a register for storing parameters selected from said memory device by said address signals;

a horizontal position counter for detecting a horizontal position of a picture determined by said parameters;

a processor for processing said parameters; and a state machine for controlling said memory device, said address generator, said vertical position detector, said first register, said horizontal position counter and said processor, wherein said processor comprises:

a code processor;

a code memory for storing said parameters; and a register for providing a feedback loop from said code memory to said code processor.

5. The apparatus of claim 4, wherein said code processor further comprises means for color mixture, separation of layer levels and justification of transparency.

6. The apparatus of claim 4, wherein said parameters comprise color codes and layer codes.

7. An apparatus for generating pictures comprising:

a memory device;

a picture address generator, coupled to said memory device, for generating a parameter address signal;

a parameter address generator, coupled to said picture address generator and to said memory, for generating a color code address signal;

a vertical position detector coupled to said address generators for controlling the generation of said address signals;

first-in-first-out register for storing said parameter address;

a first register for storing parameters selected from said memory device by said address signals;

a horizontal position counter for detecting a horizontal position of a picture determined by said parameters;

a code processor for post-processing said parameters;

a code memory for storing post-processed parameters;

a register for providing a feedback loop from said code memory to said code processor; and a state machine for controlling said memory device, said address generators, said vertical position detector, said first register, said horizontal position counter and said code processor.

* * * * *